Patented Sept. 4, 1945

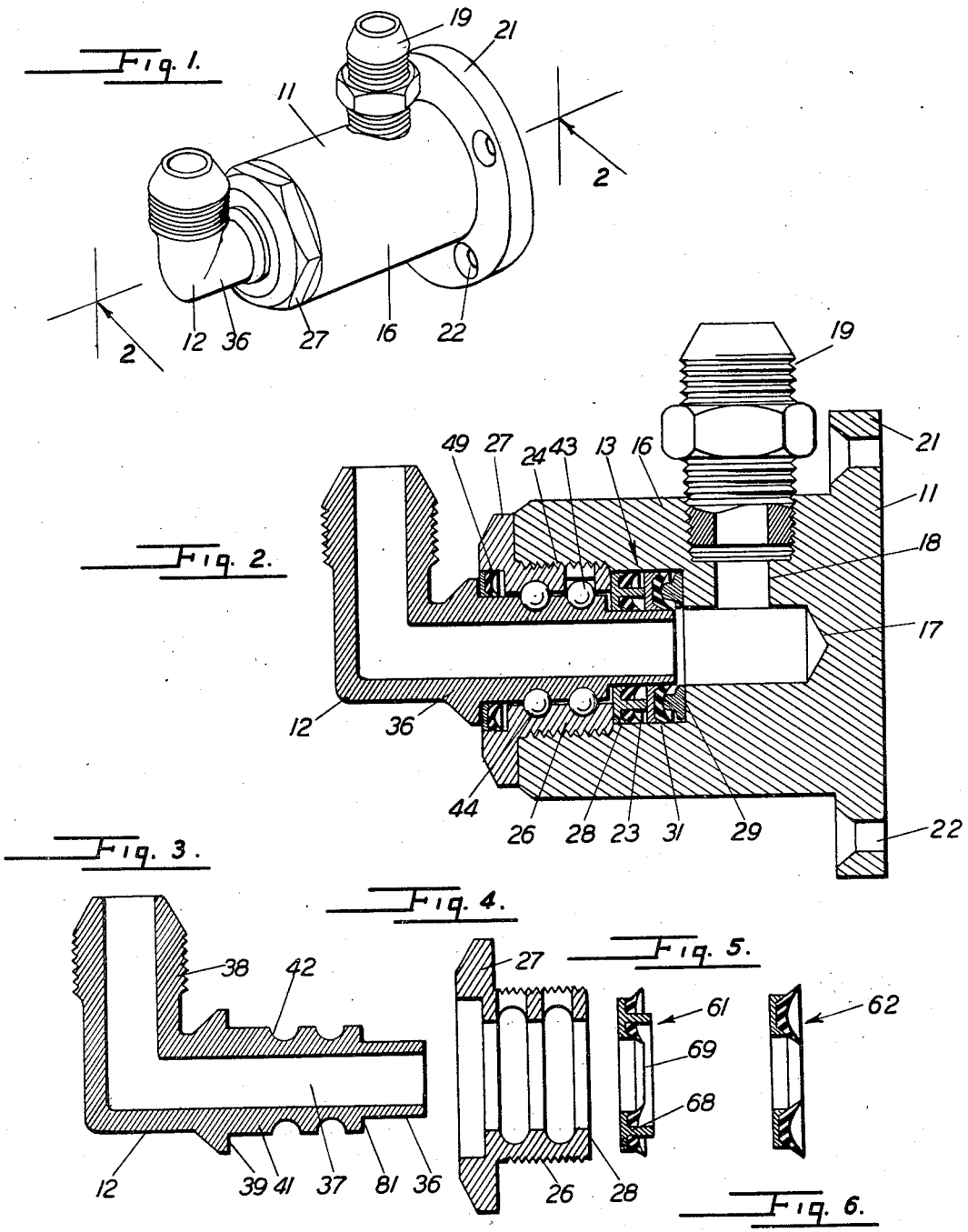

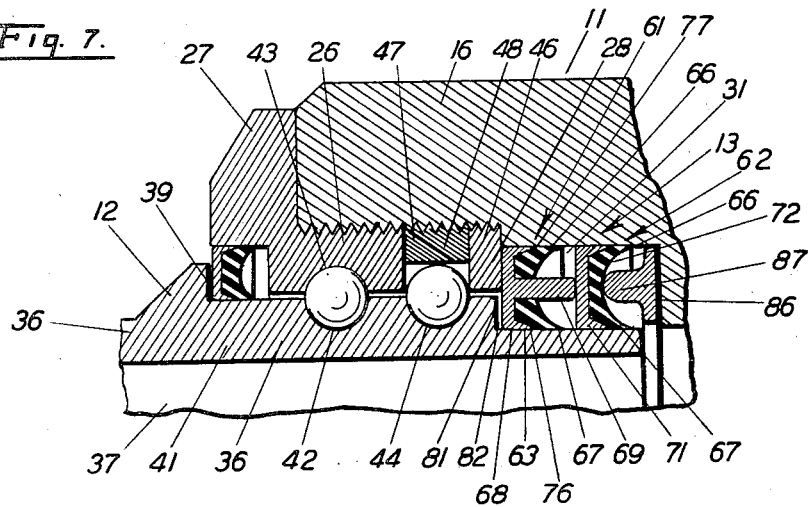
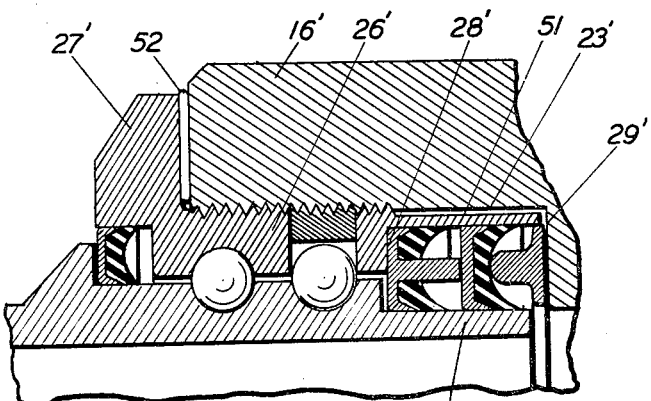
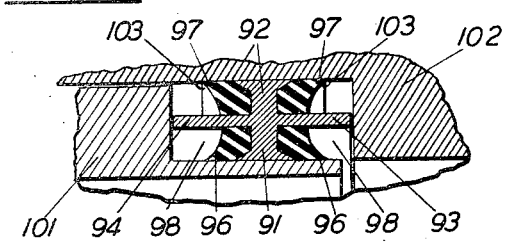

2,384,360

UNITED STATES PATENT OFFICE 2,384,360

SWIVEL PIPE COUPLING

Frank M. Allen, Azusa, and Clyde B. Taylor, Long Beach, Calif., assignors to The All-Flex Corporation, Los Angeles, Calif., a corporation of California Application February 9, 1942, Serial No. 430,066

6 Claims. (Cl. 285—97.3)

This invention relates to swivel pipe and tubing couplings for interconnecting two portions of a pipe or other fluid conduit for rotary movement with respect to each other and maintaining their bores in communication to conduct fluid from one to the other without leakage at the coupling.

An object of our present invention is the provision of a coupling of the general character indicated having such a high degree of flexibility that it offers but little resistance to relative movement between the parts which it interconnects and yet which provides sufficiently positive proof against leakage that it is adapted for use as part of such mechanisms as hydraulic brake systems and other hydraulically operated devices of aircraft, where fullest reliance must be placed upon the maintenance of fluid pressures even under severe and long sustained conditions of operation.

Another object in this connection is the provision of a highly efficient flexible coupling of exceptionally light weight and compact design, as contributory factors toward its suitability for aircraft service.

Another object of our present invention is to provide a packing of new and improved design and possessed of features of advantage which adapt it for use in those types of service where high fluid pressures are apt to be encountered and where the greatest importance attaches to the positive prevention of leakage over sustained periods of operation and under highly adverse conditions, such as excessive vibration, extremes of temperature, and rapid and very extensive fluctuations of temperature.

A further object is to provide a packing which, while not necessarily limited to, is particularly adapted for use in conjunction with the coupling to which reference has been made hereinabove, since the improvements in the packing which are responsible for its efficient operation lend themselves to incorporation in a packing of very small dimensions.

This invention possesses other objects and features of advantage, some of which, with the foregoing, will be set forth in the following description of the preferred forms of our invention which are illustrated in the drawings accompanying and forming part of this application. It is to be understood that we do not limit ourselves to the showing made by the said drawings and description, as we may adopt variations of the preferred forms within the scope of our invention as set forth in the claims.

Referring to the drawings:

Figure 1 is a perspective view of a swivel pipe coupling embodying the principles of the present invention.

Figure 2 is an enlarged, medial, vertical sectional view, the plane of section being indicated by the line 2—2 of Figure 1 and the direction of view by the arrows.

Figure 3 is a similar view of the male coupling element alone.

Figure 4 is a medial sectional view of the gland but which forms a portion of the female coupling element.

Figure 5 is a medial sectional view of the outer packing element.

Figure 6 is a similar view of the inner packing element.

Figure 7 is a fragmentary view drawn to an enlarged scale showing a portion of each of the male and the female coupling elements, the gland nut and the packing element.

Figure 8 is a view similar to Figure 7 but showing a slightly modified form of swivel pipe couplings.

Figure 9 is another view similar to Figure 7, but showing a modified form of packer.

The swivel pipe coupling of the present invention comprises three principal parts, to-wit: a female coupling element 11, a male coupling element 12 revoluble with respect thereto, and a packing set 13 interposed between and so associated with the male and female coupling elements 12 and 11, respectively, as to prevent leakage therebetween even at those times when one is turning with respect to the other.

Describing first the female element of the coupling, this comprises a body portion 16 having a central bore 17 which communicates with any suitable conduit (not shown) and in any convenient manner, as by a lateral passage 18 leading to one side of the body portion 11 where a nipple 19 is threadedly engaged with the female element 11. The female element 11 is also provided with a suitable means for rigidly mounting the housings upon a supported structure, such as an end flange 21 having preferably a plurality of holes 22 therein through which fastening screws or their equivalent may extend.

At the other end of the female element 11 the bore 17 is enlarged as by a counterbore 23; and adjacent the outer end of the counterbore 23 it is interiorly threaded as indicated at 24 to receive a gland nut 26 and the end flange 27 of which preferably is of suitable wrench-receiving shape, preferably hexagonal. Preferably the parts are so proportioned that when the gland nut 26 is tightened to operative position, the flange 27 makes contact with the extreme end of the female coupling element 11 as clearly shown in Figure 2. Moreover, when the gland 26 is in its tightened position, the shoulder 28 thereof which defines its extreme end is spaced a material distance from the bottom 29 of the counterbore 23, thus leaving an annular recess 31 for the accommodation of the packing set 13.

The male coupling element 12 comprises a tubular body portion 36, the bore 37 of which communicates directly with the bore 17 of the female coupling element 11 when the parts are in assembled relation. The male coupling element 12 also is provided with suitable means, such as a threaded plug end 38, for connecting the male coupling element 12 to any suitable pipe or other form of conduit. The distance that the tubular body portion 36 of the male coupling element 12 extends into the female coupling element 11 is limited by an annular shoulder 39 upon a preferably enlarged part 41 of the tubular body portion 36. A plurality, preferably a pair of ball races 42 are formed in the outer circumferential surface of this enlarged part 41. In the interior circumferential surface of the gland nut 26, complementary ball races 43 are formed in registry with the ball races 42 of the male coupling element 12. Consequently these ball races cooperate to receive antifriction balls 44 whose function it is to journal the male coupling element 12 within the gland nut 26 and thereby retain the male coupling element 12 in axial alignment with the female coupling element 11, interconnecting these two parts for free rotary motion of one with respect to the other and maintaining them against longitudinal displacement with their bores 17 and 37 in continuous communication. It will be observed therefore that the male coupling element 12 is directly mounted upon the gland nut 26 instead of upon the body portion of the female coupling element as is more customarily the case. One reason that this type of construction affords added convenience is that it greatly facilitates the matter of assembly and dismounting of the swivel pipe coupling, since it permits the mounting of gland nut 26 directly upon the tubular body portion 36 of the male coupling element 12 before the gland nut 26 is engaged upon the female coupling element 11. The cylindrical portion 46 of the gland nut is provided with a laterally extending passage 47 communicating with each of its ball races 43 with the result that after the male coupling element 12 has been thrust into the gland nut 26 the ball 44 may be inserted through the passages 47 into the aligned ball races 42 and 43 after which the lateral passages 47 should be filled with suitable plugs 48 to retain these balls 44 in operative position. Then, in order to assemble the male and female coupling elements it is necessary only to thread the gland nut 26 into the body portion 16 of the female coupling element and tighten these parts together. Conversely in order to remove the male coupling element 12 from the female coupling element 11 it is necessary only to loosen and unthread the gland nut 26 from its position in the body portion 16 of the female coupling element.

Before the ball-retaining plugs 48 are inserted, it is desirable to fill the races 42 and 43 with suitable lubricant. A grease-retaining packer 49 is therefore employed at the point of entry of the male coupling element 12 into the gland nut 26.

In the modification illustrated in detail in Figure 7 the packing set 13 is fitted to the interior of the counterbore 28 in the female coupling element 11, and therefore when the male coupling element 12 is removed from the female coupling element 11 the packing set 13 tends to remain in position within the female coupling element 11. In the modification illustrated in Figure 8, however, it will be observed that the gland nut 26' has provided upon its inner end a cylindrical extension or skirt 51 extending from the terminal shoulder 28' of the gland nut along the circumferential wall of the counterbore 23' to a position closely adjacent the bottom 29' of the counterbore 23'. Accordingly, in this modification the packing set 13' fits within the hollow interior of the skirt 51 with the result that the packing set 13' is fitted to the interior of the gland nut 26' instead of to a cylindrical portion of the body 16 of the female coupling element 11 as in the first described modification. Hence, when the gland nut 26' is removed from its assembled relation with the body portion 16' the packing set 13' is carried with it. Convenience is afforded by this construction inasmuch as it permits assembly of the packing set 13' upon the male coupling element and within the portion of the female coupling element with which the packing set is to make contact during operation, simultaneously and before the gland nut 16' is placed within the body of the female coupling element so that these parts may be visually inspected when they are in assembled relation, and the entire unit, consisting of the male coupling element, the gland nut and the packing then set in place in operative relation within the body of the female coupling element 11.

A suitable gasket 52 such as a crushed washer of lead or other relatively soft material is preferably employed in conjunction with the modification illustrated in Figure 8, this gasket being interposed between the external flange 27' of the gland nut 26' and the opposing end of the body portion 16'. The purpose of the gasket 52 is to provide assurance against leakage from the interior of the pipe joint along the exterior surface of the skirt 51, through the thread which interconnects the gland nut and the body portion, and toward this end it is interposed between flange 27 and the end of the body 16'. A washer of this type is not necessary in the first described modification for the reason that the packing set 13 engages the interior surface of the body portion 11 in such position as to preclude the possibility of any fluid leaking therepast to the threads and hence between the gland nut and the body portion of the female coupling element.

As best illustrated in Figures 5, 6 and 7, the packing set 13 comprises a plurality of (preferably two) annular packers 61 and 62. The outer packer 61, i. e., that which is most distant from the portion of the packing recess 31 which communicates with the bores of the coupling element, comprises a backing annulus 63 of rigid material, preferably metal such as brass, and outer and inner facing annuli 66 and 67, respectively, of relatively deformable material such as rubber, or in the event that the coupling is to be called upon to carry fluid that has a tendency to deteriorate rubber, of material inert to such fluid, for example the synthetic rubber known in the trade as "Neoprene." The reason for the deformable portion of the outer packer 61 being formed of two parts is that the rigid backing annulus 63 of this outer packer 61 is of substantially T-shape cross section being composed of a back flange 68 and a stem flange 69, which is of cylindrical form, extending laterally from the back flange between the outer and inner deformable annuli 66 and 67, as clearly shown in Figure 7. The back flange 68 bears against the terminal shoulder 28 of the gland nut 26 which, therefore, operates to prevent longitudinal displacement, i. e., axial movement, of the outer packer 61 by the pressure of fluid within the coupling; and since the stem flange 69 extends all the way past the deformable annuli 66 and 67 this stem flange is in position to engage the inner packer 62 and thus provide the abutment which offers similar support for the inner packer 62. An important feature of the present invention, therefore, becomes readily apparent, that feature being that the inner packer 62 is supported by the outer packer instead of by an abutment formed on or mounted upon the housing within which the packing operates as in more conventional constructions.

Since the inner packer 62 is not called upon to support any element disposed thereadjacent, its backing annulus 71 need not be provided with any such stem flange, but instead can consist solely of the flat back flange, with the result that the deformable facing annulus 72 of the inner packer 62 can conveniently be constructed of one piece.

The deformable annuli 66, 67 and 72 are provided with thin tapering lips at their inner and outer peripheral edges, making sealing engagement with the male coupling element 12 and with the female coupling 11, respectively. Consequently, these lips are more flexible than were they of thicker construction and they are correspondingly more sensitive to fluid pressure inside the coupling, to be pressed outward by such fluid pressure and enhance the efficiency of their sealing engagement with their associated coupling elements. It will also be observed that the rigid backing annuli 68 and 71 are similarly provided with tapering annular flanges 76 and 77 at their inner and outer edges, respectively. These relatively thin lips on the rigid backing member operate in a similar manner but in conjunction with much higher fluid pressures than those which the deformable annuli are called upon to retain. It is apparent, therefore, that each of the packers 61 and 62 is of a compound nature, the deformable portions thereof operating most efficiently to prevent leakage of fluid at relatively low pressure, and as the pressure imposed upon the packing increases the rigid backing member gradually coming into play because of the tendency of the thin tapering lips 76 and 77 thereof to be flexed outward by the increased fluid pressure until these metal lips make sealing engagement with their associated coupling elements and thereby not only effectually operate within themselves to prevent leakage of fluid but also to avoid all danger of trusion of the relatively fluid deformable material of their respective facing annuli into the interstices between the lips and the coupling element.

It should be understood that it is entirely within the scope of our present invention to expand this principle of supporting one packer on the one next adjacent thereto, to the extent of employing a series of three or more such packers in a single packing recess. In such an installation, each of the packers then would support all of these disposed between itself and the end of the recess at which fluid pressure enters the recess. Since the stem flange 69 with which each of the packers except the innermost is provided, retains the packers spaced apart, an annular space is maintained between each two adjacent packers, which serves as a reservoir for lubricant. The assurance of ample supply of lubricant in immediate proximity to both sides of each packer not only enhances the sealing efficiency of each packer, but it also decreases the torque of the assembled joint and makes for longer life of the packers by minimizing the wear thereof due to friction. Moreover, an important and interesting feature of a packing set consisting of a series of three or more such packers is that as long as the innermost remains in good condition, little if any fluid pressure will be permitted to reach any of the other packers of the series, with the result that their sealing lips will be pressed into intimate contact with the walls of the packing recess. Accordingly, the several packers will not all be wearing simultaneously, but will come into operation successively, each packer in turn picking up the load as the packer next adjacent thereto begins to wear to such an extent that it permits the entrapped fluid to leak past itself. It would not be inaccurate, therefore, to consider that all of those packers outside of the innermost which is in good, operative condition, are being held more or less in reserve, to be brought into operation only as the need therefor arises.

It is preferred that means be provided for predetermining with which of the coupling elements the packers shall remain fixed and with which the packing set shall make wiping or slipping engagement. The parts are illustrated as being constructed to insure that the packing set remains stationary with respect to the female coupling element 11 and permit the male coupling element 12 to rotate with respect to the packing. Toward this end the outer packer 61 makes contact with the female coupling element throughout a considerably greater area than that of its contact with the male coupling element. It should be observed that the enlarged portion 41 of the male coupling element terminates in a shoulder 81 which is sufficiently relieved to leave a space 82 between itself and the backing flange 68 of the outer packer 61, thereby further decreasing the area of contact between the packer and the male coupling element. In the case of the inner packer 62 the same area of contact exists between it and each of the coupling elements; but assurance that it will remain fixed with respect to the female coupling element is provided by its engagement with the stem flange 69 of the outer packer 61 which, as already indicated, will remain stationary with respect to the female coupling element. Further assurance that both packers will remain stationary with respect to the female coupling element is provided by an auxiliary abutment ring 86 fitted to the bottom of the packing recess 31 and having a projecting annular flange 87 which engages the inner packer 62 in position spaced from the lips 66 and 67 thereof so there will be no danger of its interfering with their operation. Preferably the parts are so proportioned that when the gland nut 26 is tightened the two packers 61 and 62 will be compressed between the gland nut and this projecting flange 87 to a degree sufficient to provide positive assurance that the packers will be anchored stationary within the counterbore of the female coupling element 11.

Figure 9 illustrates a modified form of annular packer wherein the rigid backing member 91 is of double T-shape in cross section, being formed of a back flange 92 with a cylindrical stem flange 93, 94 extending laterally from each side thereof.

Inner and outer deformable annuli 96 and 97, respectively, are associated with each of these stem flanges 93 and 94, one set of these deformable annuli facing in each direction with the result that this packer operates to prevent leakage through the packing recess 98 in either direction. Such a construction would be desirable in conjunction with a swivel pipe coupling intended to carry fluid whose pressure fluctuates to such an extent as to reverse the direction in which leakage would occur between the element of the coupling. For example a coupling of this type would be used in a line subjected, or apt to be subjected, to both positive and negative pressures. The stem flanges 93 and 94 preferably are of such length that they engage the proximal ends 101 and 102, respectively, of the packing recess 98 and thereby assure that the sealing lips 103 will not bear against the ends of the recess.

We claim:

1. In a swivel pipe coupling, a female coupling element comprising a body portion having a bore and a counterbore and a gland disposed within said counterbore and having a shoulder thereon spaced from the bottom of said counterbore to provide a packing recess therebetween, a male coupling element extending through said gland and into said packing recess, means connecting said male coupling element said gland for free rotary movement with respect thereto and retaining said male element against axial movement therein, and packing means disposed within said recess and making sealing engagement with both of said coupling elements, a portion of said male coupling element defining a wall of said packing recess being relieved to decrease the area of contact between said male coupling element and said packing means.

2. In a swivel pipe coupling, a female coupling element comprising a body portion having a bore and a counterbore, a gland mounted within said counterbore and having a shoulder thereon spaced from the bottom of said counterbore to provide a packing recess therebetween, and a skirt extending from said shoulder along the outer circumferential wall of said recess to a position adjacent the bottom of said recess, a male coupling element revoluble with respect to said female coupling element and extending through said gland and into said packing recess, and packing means within said recess fitted to the interior of said skirt and making sealing engagement with said male coupling element.

3. In a swivel pipe coupling, a female coupling element comprising a body portion having a bore and a counterbore, a gland mounted within said counterbore and having a shoulder thereon spaced from the bottom of said counterbore to provide a packing recess therebetween, and a skirt extending from said shoulder along the outer circumferential wall of said recess to a position adjacent the bottom of said recess, a male coupling element revoluble with respect to said female coupling element and extending through said gland and into said packing recess, and packing means within said recess fitted to the interior of said skirt and making sealing engagement with said male coupling element, and means for preventing leakage between said gland and said body portion of said female coupling element.

4. In a swivel pipe coupling, a female coupling element comprising a body portion having a bore and a counterbore, a gland mounted within said counterbore and having a shoulder thereon spaced from the bottom of said counterbore to provide a packing recess therebetween, and a skirt extending from said shoulder along the outer circumferential wall of said recess to a position adjacent the bottom of said recess, a male coupling element revoluble with respect to said female coupling element and extending through said gland into said packing recess, packing means within said recess fitted to the interior of said skirt, and making sealing engagement with said male coupling element, a flange on said gland, and a gasket compressed between said flange and said body portion of said female coupling element to prevent leakage around the outside of said skirt.

5. In a swivel pipe coupling, a female coupling element comprising a body portion having a bore and a counterbore, a gland mounted within said counterbore and having a shoulder thereon spaced from the bottom of said counterbore to provide a packing recess therebetween, and a skirt extending from said shoulder along the outer circumferential wall of the bottom of said recess, a male coupling element extending through said gland and into said packing recess, packing means within said recess fitted to the interior of said skirt and making sealing engagement with said male coupling element, means interconnecting said male coupling element and said gland for rotary movement with respect to each other and restraining them against axial movement with respect to each other, and packing means between said male coupling element and said gland beyond said interconnecting means from said first-mentioned packing means for restraining leakage of lubricant from said interconnecting means.

6. In a swivel pipe coupling, a female coupling element comprising a body portion having a bore and a counterbore, a gland mounted within said counterbore and having a shoulder thereon spaced from the bottom of said counterbore to provide a packing recess therebetween, a male coupling element extending through said gland and into said packing recess, packing means within said recess, means interconnecting said male coupling element and said gland for rotary movement with respect to each other and restraining them against axial movement with respect to each other, and packing means between said male coupling element and said gland beyond said interconnecting means from said first-mentioned packing means for restraining leakage of lubricant from said interconnecting means.

FRANK M. ALLEN.
CLYDE B. TAYLOR.